US012801496B2

(12) United States Patent
Roberts

(10) Patent No.: US 12,801,496 B2
(45) Date of Patent: Nov. 17, 2026

(54) FAST FAILURE RECOVERY OF APPLICATIONS

(71) Applicant: Micron Technology, Inc., Boise, ID (US)

(72) Inventor: David Andrew Roberts, Wellesley, MA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/261,601

(22) Filed: Jul. 7, 2025

(65) Prior Publication Data

US 2025/0335299 A1 Oct. 30, 2025

Related U.S. Application Data

(63) Continuation of application No. 18/581,842, filed on Feb. 20, 2024, now Pat. No. 12,353,285.

(60) Provisional application No. 63/447,208, filed on Feb. 21, 2023.

(51) Int. Cl.

| | |
|---|---|
| ***G06F 11/00*** | (2006.01) |
| ***G06F 9/455*** | (2018.01) |
| ***G06F 9/50*** | (2006.01) |
| ***G06F 11/14*** | (2006.01) |

(52) U.S. Cl.
CPC .......... *G06F 11/1407* (2013.01); *G06F 9/455* (2013.01); *G06F 9/5016* (2013.01); *G06F 11/1438* (2013.01); *G06F 2209/5011* (2013.01)

(58) Field of Classification Search
CPC .... G06F 11/1407; G06F 9/455; G06F 9/5016; G06F 11/1438; G06F 2209/5011
See application file for complete search history.

(56) References Cited

U.S. PATENT DOCUMENTS

2010/0251172 A1* 9/2010 Oxrieder ............. G06F 11/1438 715/810
2017/0364428 A1* 12/2017 Ganesan ............. G06F 11/1407

* cited by examiner

*Primary Examiner* — Jason B Bryan
(74) *Attorney, Agent, or Firm* — Schwegman Lundberg & Woessner, P.A.

(57) ABSTRACT

Disclosed in some examples, are methods, systems, and machine-readable mediums in which application state is saved using in-memory versioning in a shared memory pool of disaggregated memory. By utilizing a disaggregated memory pool, the processing resources may be on separate devices than the memory those resources are using. As a result of this architecture, a failure of hardware of processing resources or an application does not necessarily also cause the hardware resources of the memory devices to fail. This allows a standby application executing on standby processing resources to quickly resume execution when a primary application fails by utilizing the memory pool assigned to the primary application in the memory pool.

20 Claims, 8 Drawing Sheets

FAST FAILURE RECOVERY OF APPLICATIONS

PRIORITY APPLICATION

This application is a continuation of U.S. application Ser. No. 18/581,842, filed Feb. 20, 2024, which claims the benefit of priority to U.S. Provisional Application Ser. No. 63/447,208, filed Feb. 21, 2023, all of which are incorporated herein by reference in their entirety.

TECHNICAL FIELD

Embodiments pertain generally to improved computing systems. Some embodiments generally relate to using disaggregated memory systems. Some embodiments relate to using a disaggregated memory shared across first and second processing resources along with in-memory versioning techniques to save an application state within disaggregated memory using in-memory versioning. Some embodiments relate to using the saved application state for fast failover of an application upon hardware or software failure.

BACKGROUND

Host computing systems may be configured to perform a variety of different tasks by instructions of a software application. While executing, the software application makes use of system memory, such as non-volatile memory to save application state such as a current instruction being executed, variables, and calculations. In the event of a hardware or software failure, any application state may be lost. For some applications, this is unacceptable. As a result, these applications may periodically store checkpoint and state information in a non-volatile storage. Storing this data in non-volatile storage slows down the application as storage to non-volatile storage typically takes longer than storing data in volatile storage.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
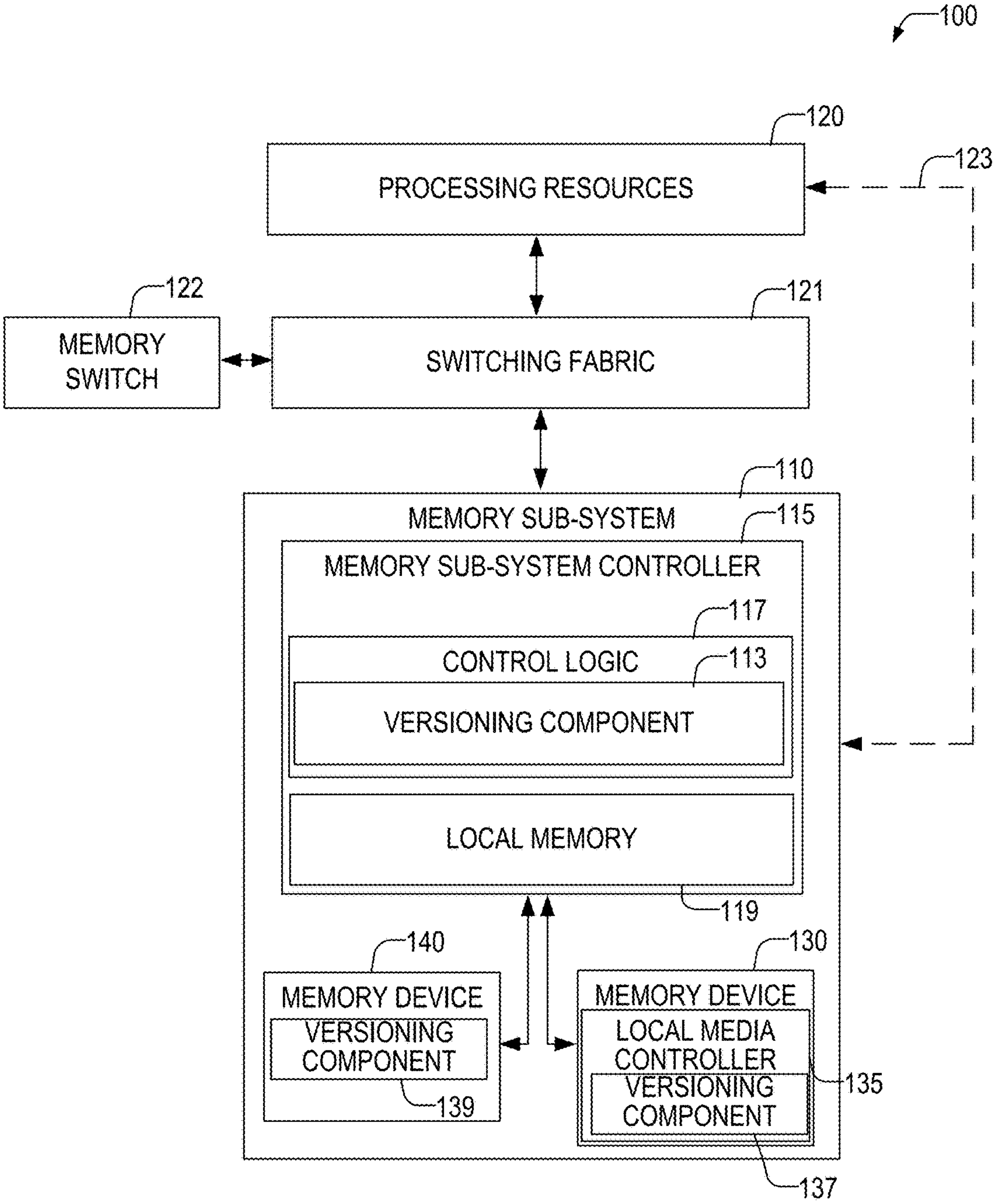
FIG. 1 illustrates an example computing system that includes a memory subsystem, in accordance with some examples of the present disclosure.

Applications may save checkpoint data in non-volatile storage in case of a hardware and/or software failure. Upon a failure, in some examples, the execution of the application is switched to a redundant or standby hardware and/or application. This process is called "failover." In other examples, the processing resources and/or the application may simply restart. In either case, the application state data is read from non-volatile storage. While this is both quicker than having to restart the application from an initial state, and provides less opportunity for data loss, loading state information from non-volatile storage still requires time. In the case of a hardware failure, the entire computing device may need to be restarted first. In the case of a standby processing resource and/or application instance, reading the data from non-volatile storage may require a network or other non-local access to obtain the checkpoint data. In the case that execution time is critical, or in case of a user-facing application, these delays may be noticeable and unacceptable.

In an example, a primary application sends checkpoint data over a network to the failover processing resources, which stores the checkpoint data locally. This reduces failover time but increases the resource cost of providing the checkpoint data as it requires additional network resources and delays execution of the primary application during network updates.

One example application in which such delays may be unacceptable is a virtual machine application. A virtual machine application virtualizes the hardware of the host computing system. Each instance of a virtual machine application executing on the host exhibits the behavior of a separate computing device including the execution of applications. As with other applications, the virtual machine application may continuously push main memory data modifications from a Virtual Machine (VM) on one host processor to a standby VM on another processor or server, over the network, to use its memory as a backup. In the event of a processor or server failure, the workload may failover to the standby VM with only a short amount of processing that is lost and must be re-computed.

Scalable shared memory subsystems ("disaggregated memory"), enabled by extremely fast system interconnects like Compute Express Link (CXL) and Gen-Z, may be used to make a same shared memory pool accessible to a group of processing resources. Memory in the memory pool may be in different hardware devices. The memory in the memory pool may be accessed similarly to as if it was local to the hardware devices.

Disclosed in some examples, are methods, systems, and machine-readable mediums in which application state is saved using in-memory versioning in a shared memory pool of disaggregated memory. By utilizing a disaggregated memory pool, the processing resources may be on separate devices than the memory those resources are using. The memory hardware resources may be designed with built-in redundancy with memory switches, power supplies, and other features to make those resources robust. As a result of this architecture, a failure of hardware of processing resources or an application does not necessarily also cause the hardware resources of the memory devices to fail. This allows a standby application executing on standby processing resources to quickly resume execution when a primary application fails by utilizing the memory pool assigned to the primary application in the memory pool. This eliminates the need to explicitly replicate software application memory on a separate networked machine (e.g., a conventional "distributed memory" system).

One problem with using disaggregated memory in this way is that often hardware and/or application failures are caused by bad data. That is, the memory may have one or more values that were set improperly, had bits that were flipped (e.g., by cosmic radiation), or the like. In addition, the memory may store partial results—that is, the hardware may fail in the middle of a calculation and the state of the memory may be uncertain (inconsistent). In order to solve this problem, in some examples, the shared memory in the pool may utilize in-memory versioning to save known-good snapshots of application state directly at the memory system. Upon restart from a failure, in addition to the standby application instance on a different processor resource using the memory allocated to the primary application, the system may rollback data in the memory to the last versions that were checkpointed. Because the checkpointing is done directly in memory, this allows for fast restore of a last-known good state of the application.

The above solutions provide for fast and efficient failover of an application that avoids the drawbacks of copying application state data to either another machine or to non-transitory memory. In addition, by using in-memory versioning, the technical problems of using potentially corrupted memory values are solved with the technical solution of using in-memory versioning which allows for fast checkpointing and restore. The disclosed techniques allow for high availability of software (such as virtual machines) in a disaggregated memory system. Error recovery can be faster, with lower energy costs, and lower bandwidth costs than approaches which copy data across a network to a backup device.

In some examples, to implement in-memory versioning, the memory device allocates or assigns two or more memory locations within the memory device to a single corresponding memory request address. One memory location stores the known-good value of the request address as of the time of a most recent or last commit operation. The other memory location stores the working copy—that is, it stores the updated value, which reflects to the checkpoint value, since the last commit or rollback operation. Whether a particular read or write to a particular request address is serviced using the first or second memory locations depends on the state of metadata and the in-memory versioning mode.

A first mode, called Zero Copy (ZC) mode, utilizes two memory locations that alternate between serving as a checkpoint memory location and the working copy memory location between each checkpoint. That is, at a first checkpoint interval a first memory location stores the checkpointed value and the second memory location stores the working value. At the next checkpoint interval, the roles reverse and the first memory location stores the working value and the second memory location stores the checkpointed value. This avoids the need to copy a value from one memory location to another memory location. A metadata field for each request address stores a select field that indicates which memory location is the working copy and which is the backup. To handle an incoming read command, the memory device must first check metadata associated with the request address. In particular the memory device checks a select metadata(S) field to determine which of two locations is the working copy location. The read command is then serviced from the location indicated by the select metadata. For write commands, the memory system first checks to determine whether another field in the metadata, the dirty (D) field, is set. The D field indicates whether the memory location was updated since the last checkpoint (i.e., either a commit or rollback instruction). If the D field indicates that the memory location was updated more recently than the last checkpoint, then the memory system writes to the memory location indicated by the S field. If the D field is not set, then it indicates this is a first write to the memory location since a commit or rollback. In this case, the memory system changes the S field to point to the other memory location, sets the D field to indicate that the memory location was updated more recently than the last checkpoint, and then writes the data in the location indicated by the new S field. In some examples, the S and D fields are bits and may be referred to as an S bit or bits and a D bit or bits. In these examples, changing the S field may comprise inverting the S field and changing the D field may comprise inverting the D field. On a commit operation, if the D field is set, then the D field is cleared and the select field is kept the same. On a first write to this memory location after the commit, the S field will be switched, and the committed value will be preserved. On rollbacks, the S field is changed to point to the other memory location and the D field is cleared.

In a second mode, called Direct Copy (DC), the active working copy is found in a particular one of the memory locations (the working location), removing the need to look up the S field beforehand. In some examples, the S field may be unused in this mode. The memory device reads the working location on a read request. For write requests, the memory device checks the dirty field. If the dirty field is not set, then the working location is copied to the checkpoint location and the R field is set. On writes to already modified data, the working location is written. On Commit operations, the dirty field is reset. On Rollback operations, if the dirty field is not set, no action is taken. If the dirty field is set, then the working location is copied over to the checkpoint location and the dirty field is reset.

More information on in-memory versioning can be found in U.S. patent application Ser. No. 17/970,132 "Adaptive Control for In-Memory Versioning," which is incorporated by reference herein in its entirety.

While in-memory versioning described herein utilizes a pair of physical addresses (memory locations) for each request address, more than two physical addresses may also be used. For example, if the in-memory versioning technique includes storing more than one checkpoint value per request address, then additional memory locations may be allocated.

FIG. 1 illustrates an example computing system 100 that includes a memory subsystem 110 and processing resources 120, in accordance with some examples of the present disclosure. The computing system 100 may be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), distributed computing device, or such computing device that includes memory and a processing device. The computing system 100 may also be a series of connected computing devices, a set of multiple computing devices, or the like.

The memory subsystem 110 may be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The memory subsystem 110 may include media, such as one or more memory devices, such as memory device 130 and/or 140. The memory devices 130, 140 may include any combination of the different types of non-volatile memory devices and/or volatile memory devices. Some examples of non-volatile memory devices include a negative-and (NAND) type flash memory (including 2D and 3D NAND), read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM), and write-in-place memory, such as a three-dimensional cross-point ("3D cross-point") memory device, which is a cross-point array of non-volatile memory cells. A cross-point array of non-volatile memory may perform bit storage based on a change of bulk resistance, in conjunction with a stackable cross-gridded data access array. Additionally, in contrast to many flash-based memories, cross-point non-volatile memory may perform a write in-place operation, where a non-volatile memory cell may be programmed without the non-volatile memory cell being previously erased. NAND type flash memory includes, for example, two-dimensional NAND (2D NAND) and three-dimensional NAND (3D NAND).

A non-volatile memory device may be organized as a package of one or more memory dies. Each die may comprise of one or more planes. For some types of non-volatile memory devices (e.g., negative-and (NAND)-type devices), each plane may be comprised of a set of physical blocks. For some memory devices, blocks are the smallest area that may be erased. Each block is comprised of a set of pages. Each page is comprised of a set of memory cells, which store bits of data. The memory devices may be raw memory devices (e.g., NAND), which are managed externally, for example, by an external controller. The memory devices may be managed memory devices (e.g., managed NAND), which are a raw memory device combined with a local embedded controller (e.g., control logic 117) for memory management within the same memory device package.

A memory device, such as memory device 130 and/or 140 may be a volatile memory device. The volatile memory devices (e.g., memory device 140) may be, but are not limited to, random access memory (RAM), such as dynamic random-access memory (DRAM) and synchronous dynamic random access memory (SDRAM). Example volatile memory devices include Double Data Rate (DDR) Synchronous Dynamic Random-Access Memory (DDR SDRAM). In some examples, a volatile memory device may be organized as a package of one or more memory dies. Each die may be organized into one or more rows and columns.

Processing resources 120 may include one or more hardware processing resources, such as hardware processors, other computing devices (with its own memory resources), or the like. The processing resources 120 may include one or more hardware processors, chipsets, software stacks executed by the hardware processors. The hardware processors may include one or more cores, one or more caches, a memory controller (e.g., NVDIMM controller), and a storage protocol controller (e.g., a peripheral component interconnect express (PCIe) controller, serial advanced technology attachment (SATA) controller). For example, a processing resource of processing resources 120 may be a hardware processor or may be a separate computing system with a hardware processor and memory system.

Processing resources 120 may utilize one or more memory subsystems 110 to store data. The processing resources 120 may send access requests to the memory subsystem 110, such as to store data at the memory subsystem 110 and to read data from the memory subsystem 110. In some examples, one or more of the processing resources 120 may communicate with the memory subsystem 110 through a local interface 123. In other examples, one or more of the processing resources 120 may communicate with the memory subsystem 110 through a switching fabric 121 that is controlled by a memory switch 122. In still other examples, some processing resources 120 may communicate with the memory subsystem 110 through the local interface 123 and some of the processing resources 120 may communicate with the memory subsystem 110 through the switching fabric 121.

The processing resources 120 may be coupled to the memory subsystem 110 via a physical host interface such as a bus or interconnect either through a local interface 123 or the switching fabric 121. Examples of a physical host interface include, but are not limited to one or more of: a Serial AT Attachment (SATA) interface, a Peripheral Component Interconnect express (PCIe) interface, Universal Serial Bus (USB) interface, Fiber Channel, Small Computer System Interface (SCSI), Serial Attached SCSI (SAS), Universal Flash Storage (UFS), Non-Volatile Memory Express (NVMe), Compute Express Link (CXL), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface may be used to transmit data between the processing resources 120 and the memory subsystem 110. The physical host interface may provide an interface for passing control, address, data, and other signals between the memory subsystem 110 and the processing resources 120. FIG. 1 illustrates a memory subsystem 110 as an example. In general, the processing resources 120 may access multiple memory subsystems via a same communication connection, multiple separate communication connections, and/or a combination of communication connections.

The memory subsystem 110 may include a memory subsystem controller 115. The memory subsystem controller 115 may include a control logic 117 such as a hardware processor configured to execute instructions stored in local memory 119. The memory subsystem controller 115, control logic 117, versioning component 113, and/or local memory 119 may utilize hardware such as one or more integrated circuits and/or discrete components, a buffer memory, or a combination thereof. The hardware may include digital circuitry with dedicated (i.e., hard-coded) logic to perform the operations described herein. The hardware may be a microcontroller, special purpose logic circuitry (e.g., a field programmable gate array (FPGA), an application specific integrated circuit (ASIC), etc.), or other suitable processor.

In the illustrated example, the local memory 119 of the memory subsystem controller 115 stores instructions for performing various processes, operations, logic flows, and routines that control operation of the memory subsystem 110, including handling communications between the memory subsystem 110 and the processing resources 120. In some examples, instructions, in the form of versioning component 113 may be stored in local memory 119 and, when executed by the control logic 117, may implement the functions of the versioning component 113 as herein described. In some examples, the versioning component 113 may be specific arrangements of hardware components within the control logic 117 such as various arrangements of transistors and other integrated circuit components.

In some embodiments, the local memory 119 may include memory registers storing memory pointers, fetched data, and so forth. The local memory 119 may also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and may instead rely upon external control (e.g., provided by an external host, or by a processor or controller separate from the memory subsystem).

In general, the memory subsystem controller 115 may receive commands or operations from the processing resources 120 and may convert the commands or operations into instructions or appropriate commands to achieve the desired access to the memory devices 130 and/or the memory device 140. The memory subsystem controller 115 may be responsible for other operations such as wear leveling operations, garbage collection operations, error detection and error-correcting code (ECC) operations, encryption operations, caching operations, and address translations between a logical address (e.g., logical block address (LBA), namespace) and a physical memory address (e.g., physical block address) that are associated with the memory devices 130. The memory subsystem controller 115 may further include host interface circuitry to communicate with the processing resources 120 via the physical host interface. The host interface circuitry may convert the commands received from the processing resources 120 into command instructions to access the memory devices 130 and/or the memory device 140 as well as convert responses associated with the memory devices 130 and/or the memory device 140 into information for the processing resources 120.

The memory subsystem 110 may also include additional circuitry or components that are not illustrated. In some embodiments, the memory subsystem 110 may include a cache or buffer (e.g., DRAM) and address circuitry (e.g., a row decoder and a column decoder) that may receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) may externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

As previously noted, the memory subsystem controller 115 may include a versioning component 113. Versioning component manages in-memory versioning of data stored on one of the memory devices 130, 140 (e.g., maintaining versions of data stored on individual rows of the memory devices 130, 140). For some embodiments, the versioning component 113 enables the memory subsystem 110 to maintain different versions of data for different sets of memory request addresses of one of the memory devices 130, 140. The versioning component 113 may enable the memory subsystem 110 (via the memory subsystem controller 115) to use stored in-memory versioning data to facilitate a rollback operation/behavior, a checkpoint operation/behavior, or both as described herein with respect to an individual set of request memory addresses of one of the memory devices 130, 140. Where the memory subsystem 110 implements a transactional memory functionality or features, the versioning component 113 may enable the memory subsystem 110 (via the memory subsystem controller 115) to use stored in-memory versioning data to facilitate rollback of a memory transaction (e.g., rollback a failed memory transaction), commit (e.g., checkpoint) of a memory transaction, or handling of a read or write command associated with respect to a memory transaction (e.g., detect and resolve a conflict caused by a write command) as described herein. As used herein a memory request address may be a physical memory address that is included in a memory request (e.g., a load or store) and/or may be a physical address produced after conversion from one or more virtual addresses. The memory request address may then be selectively converted into a different address by the versioning component 113 to service the memory request dependent on the active in-memory versioning mode and the metadata of the request address. In some examples, one or more functions of versioning component 113 may be performed by versioning component 137 and/or 139 within memory device 140 and/or memory device 130.

Figure 2:
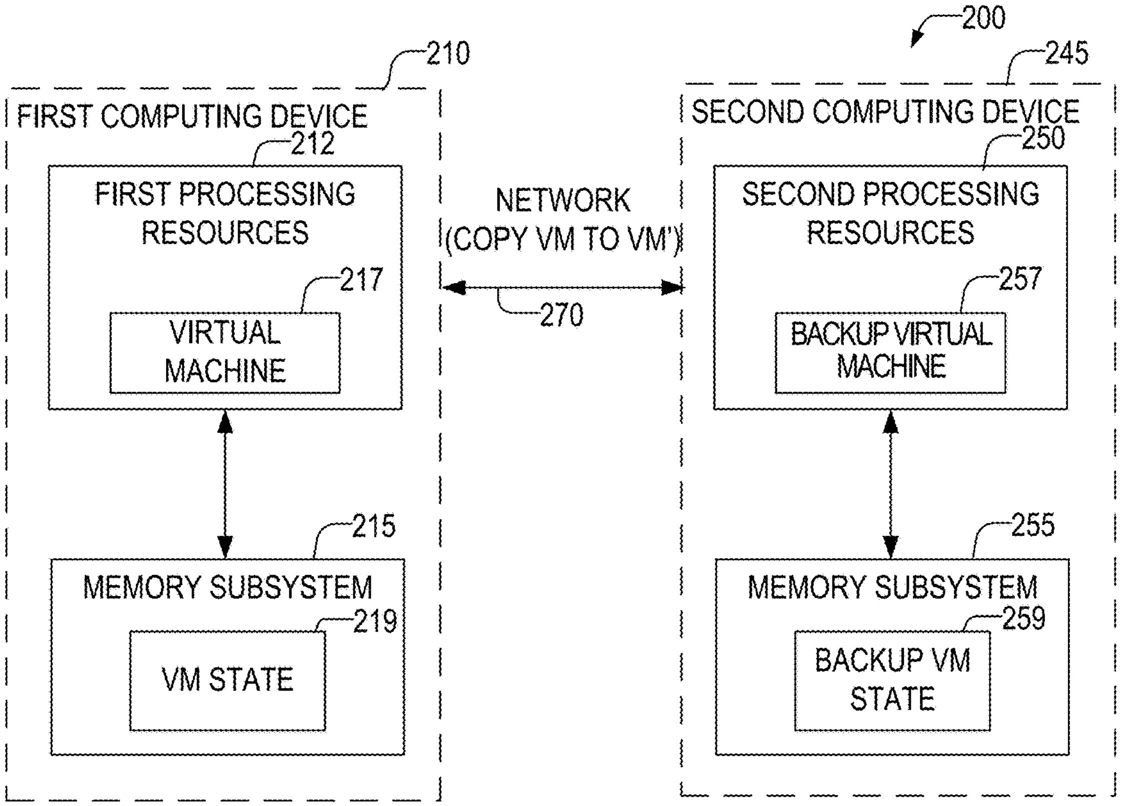
FIG. 2 illustrates a computing system with two different computing devices according to some examples of the present disclosure.

FIG. 2 illustrates a computing system 200 with two different computing devices according to some examples of the present disclosure. First computing device 210 may include first processing resources 212 (which may be an example of processing resources 120 of FIG. 1) which are executing an application, specifically a virtual machine application 217. First computing device 210 includes a memory subsystem 215, such as a RAM that stores an application state, such as a virtual machine state 219. Memory subsystem 215 may be an example of memory subsystem 110. First computing device 210 is in communication, such as over a network, with a second computing device 245. The first processing resources 212 periodically saves checkpoint data of virtual machine state 219 to the second computing device 245 using messaging 270. Second computing device 245 may include second processing resources 250 and a second memory subsystem 255. Second memory subsystem 255 may be an example of memory subsystem 110. The checkpoint data is saved by the second processing resources 250 as a backup VM state 259. In some examples, the second processing resources may be running a backup application, such as a backup virtual machine 257. Upon a failure of the first computing device 210 or the virtual machine application 217, the execution of the virtual machine application 217 halts and is failed to backup virtual machine 257 using the backup VM state 259. As previously noted, this situation requires significant overhead of networking and processing resources when copying application state from the first computing device 210 to the second computing device 245.

Figure 3:
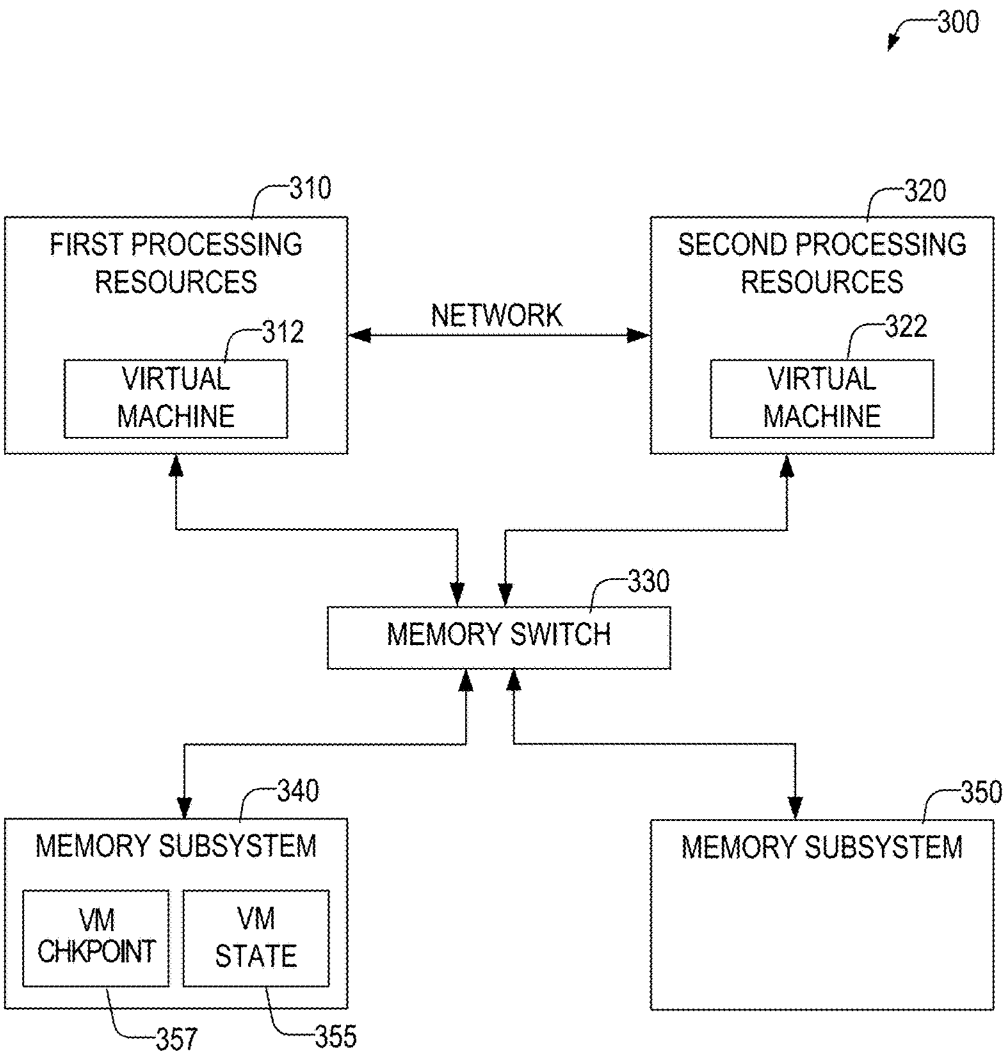
FIG. 3 illustrates a computing system with automated failover using disaggregated memory according to some examples of the present disclosure.

FIG. 3 illustrates a computing system 300 with automated failover using disaggregated memory according to some examples of the present disclosure. First processing resources 310 may execute one or more applications, such as a virtual machine application 312. First processing resources may be an example of processing resources 120. The virtual machine application 312 may be allocated working memory from memory subsystem 340 to store virtual machine state information 355. Memory subsystem 340 and memory subsystem 350 may be independent (e.g., in an independent computing device) of the first processing resources 310 and second processing resources 320 and may be disaggregated and fault tolerant with built in redundancy such as memory switches, power supplies, or may be non-volatile memory. Memory that is part of memory subsystem 340 and 350 may be pooled and allocated to applications on processing resources 310 and 320 as necessary. Memory switch 330 may route memory requests to the appropriate memory subsystem 340. For example a memory address may be routed by the memory switch 330 through a switching fabric (e.g., switching fabric 121) to a particular memory subsystem 340 on which the memory corresponding to the address is located.

Memory subsystem 340 may utilize in-memory versioning to store checkpointed copies of values of the application state (e.g., VM state information 355) as application checkpoint values, such as virtual machine checkpoint data 357. Application state data may include any memory allocated to the application and/or state information for the first processing resources 310 corresponding to the application, such as process states, scheduling information, memory allocations, open file information, a program counter, register values, or the like. Periodically, the application (e.g., virtual machine application 312) may perform commit or rollback operations as necessary. Data that is committed is then considered the checkpoint data according to the IMV scheme (as discussed above).

Upon a failure of the virtual machine application 312 and/or the first processing resources 310, the second processing resources 320 (e.g., an operating system or other application) or the memory switch 330 may detect the failure. In response, the second processing resources 320 may begin executing the virtual machine application 322 using the VM state information 355 or the VM checkpoint data 357. In some examples, the system will use the VM checkpoint data 357 as this data represents the last-known-good values. The virtual machine application 322 may have their memory mapped directly to the VM checkpoint data 357 or the VM state information 355 directly by the memory switch 330 or by an operating system on the second processing resources 320.

In examples in which the VM checkpoint data 357 is used, the memory subsystem 340 may do a rollback operation of the VM state information 355 to the VM checkpoint data 357. The rollback operation will prepare the system for storing new values based upon the checkpoint data. If the virtual machine application 322 is already executing, then the system may switch over from the first processing resources 310 to the second processing resources 320 in the time it takes to map the memory of the virtual machine application 322 to the VM state and VM checkpoint memory and to do a rollback operation (if the VM checkpoint data 357 is what is to be used).

Figure 4:
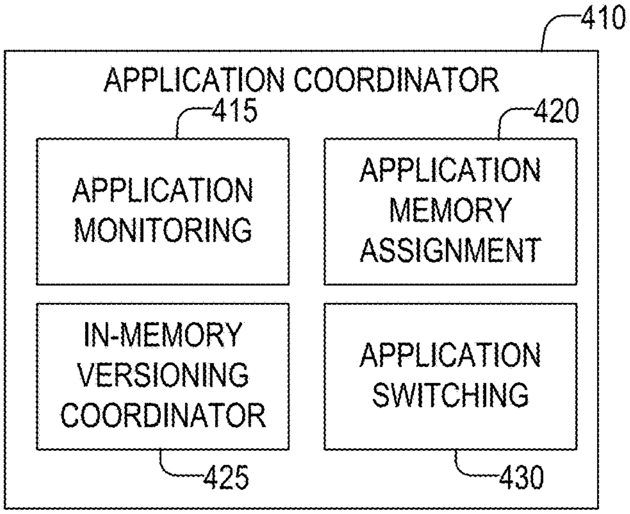
FIG. 4 illustrates an application coordinator according to some examples of the present disclosure.

FIG. 4 illustrates an application coordinator according to some examples of the present disclosure. Application coordinator 410 may execute on one or more processing resources (e.g., processing resources 120)—such as within an operating system; may execute within the memory switch, such as memory switch 122; memory subsystem controller 115; or some other computing device. Application coordinator 410 may be hardware or software. Application coordinator 410 may include an application monitoring component 415 which may monitor applications and/or hardware resources for errors or problems. In some examples, the application and/or hardware may periodically provide one or more "keep alive" messages. The failure to receive a "keep-alive" message within a specified period of time indicates a hardware and/or software failure. In some examples, a fabric manager, which may be a software or hardware controller with standardized interfaces and Application Programming Interfaces (APIs) may be one component that executes Application coordinator tasks.

Application memory assignment component 420 assigns one or more memory resources to one or more applications and/or processing resources in a disaggregated memory architecture. For example, assigning one or more of the processing resources 120 to one or more memory locations on one or more memory devices 130 and/or 140 of one or more memory subsystems 110. Applications or operating systems (on behalf of applications) executing on processing resources may send a memory request to allocate a memory space for the application. Application memory assignment component 420 may track the total amount of memory in the disaggregated memory system, and may allocate free memory. A memory allocation may reserve the memory for a particular application and may map an application-specific or processing resource-specific memory address space to specific physical resources which may be disaggregated from the processing resources. This mapping may be stored in a table of memory switch 122 and is used to route memory requests from processing resources to the appropriate memory subsystems.

In-memory versioning coordinator 425 may track which memory systems support in-memory versioning. In some examples, the application and/or operating system may request memory allocations from application memory assignment component 420 which are capable of in-memory versioning. The application may then request, either directly from the memory device or from the in-memory versioning coordinator 425 to enable the in-memory versioning for one or more addresses assigned to the application.

Applications may register primary and/or backup application instances with the application switching component 430. In some examples, multiple backup instances may be registered and a priority order may be established specifying which backup instances to execute first. Application instances may be identified based upon an identifier and the one or more processing resources upon which they are running. Backup application instances may be in a low-power or sleep state until they are selected for a failover of a primary application instance (or failover from another backup application instance). Application monitoring component 415 may determine that an application, or hardware running an application has ceased processing or has restarted. In response, the application switching component 430 may assign a secondary application (e.g., based upon an earlier registration), which may be on secondary processing resources to the memory previously assigned to the original application. In some examples, the application switching component 430 may first send a rollback command to the memory device to rollback to known-good values using the in-memory versioning scheme.

Figure 5:
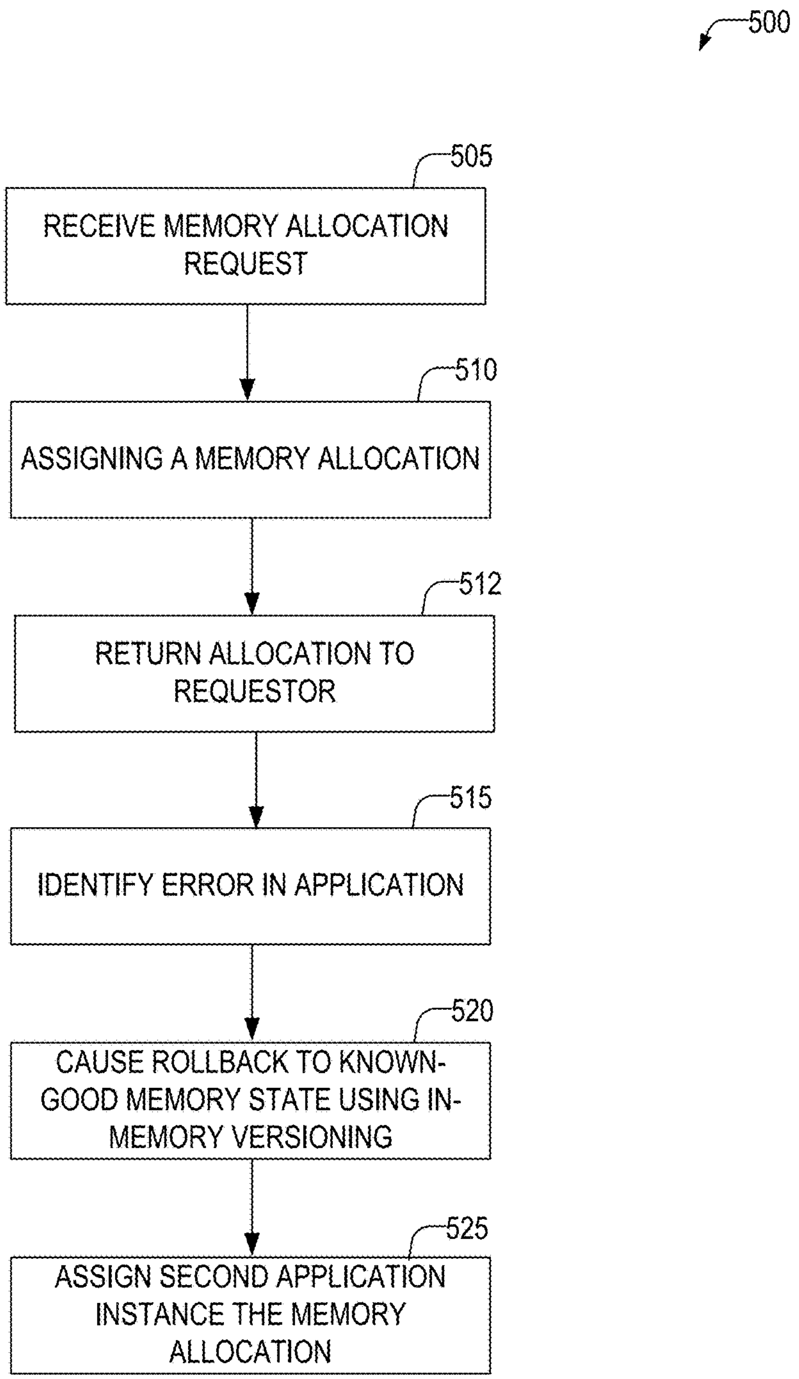
FIG. 5 illustrates a flowchart of a method of an application coordinator, such as application coordinator, according to some examples of the present disclosure.

FIG. 5 illustrates a flowchart of a method 500 of an application coordinator, such as application coordinator 410, according to some examples of the present disclosure. At operation 505 the system receives a memory allocation request requesting a memory allocation from a pool of disaggregated memory. The request may be sent by an application directly or on behalf of the application by an operating system. The operating system and/or application may be executing on one or more processing resources. At 510 the system assigns a memory allocation to the application. The memory allocation may be for one or more memory addresses within one or more memory systems and/or devices. The memory allocated may be wholly, or partially, capable of in-memory versioning. In some examples, the memory request at operation 505 may specify that in-memory versioning is requested for all, or part of, the allocation. In examples in which only a part of the allocation is requested to have in-memory versioning, a particular amount of the pool that the application requests for in-memory versioning may be specified. The assigning operation at operation 510 may then attempt to fulfil this request. At operation 512, the application coordinator may return the allocation to the requestor. The allocation returned may be a memory range allocated along with addresses for accessing the memory, a status, code, and/or the like.

At operation 515, the system may identify an error in the application. The error may be a computational error, a failure of the application to respond to a heartbeat or keep alive message, a failure of the application to respond to a status message, a failure message from the application, or some other method of determining that the application, and/or the processing resources on which it is executing has failed.

At operation 520, in some examples, the system may inform the memory system on which the memory allocated through the allocation request is located to rollback any values changed since a last checkpoint to rolled-back values. This may rollback the application state data values to checkpointed values. In some examples, this operation may be done by a second (e.g., standby) instance of the application rather than the application coordinator.

At operation 525, the system assigns the memory allocated at operation 510 to a second instance of the application. In some examples, the first instance of the application and/or an operating system registers the second instance with the application coordinator as previously described. After a failure occurs, the second instance is assigned the same memory space that was assigned to the first instance at operation 510. In some examples, assigning the memory space includes populating an address map or table that produces routing information that routes a request from the processing resources to the appropriate memory system given an allocated address. For example, assigning the memory space can include mapping an address local to the application and/or the processing resources with a global address that specifies or otherwise identifies the memory system. To reassign the address space, the memory routing table overwrites the information describing the owner of the memory allocation from operation 510 with information about the second instance of the application. For example, if at operation 510, the memory routing table was updated to indicate that a particular address is allocated to a process identifier of the first instance of the application executing on a particular processing resource, when that memory address is reassigned at operation 525, the routing table is updated to indicate that the particular address is allocated to a process identifier of the second instance of the application executing on a same or different processing resource. In other examples, instead of a routing information in a switch, the routing information may be page tables in a secondary (e.g., backup) computing resource.

Figure 6:
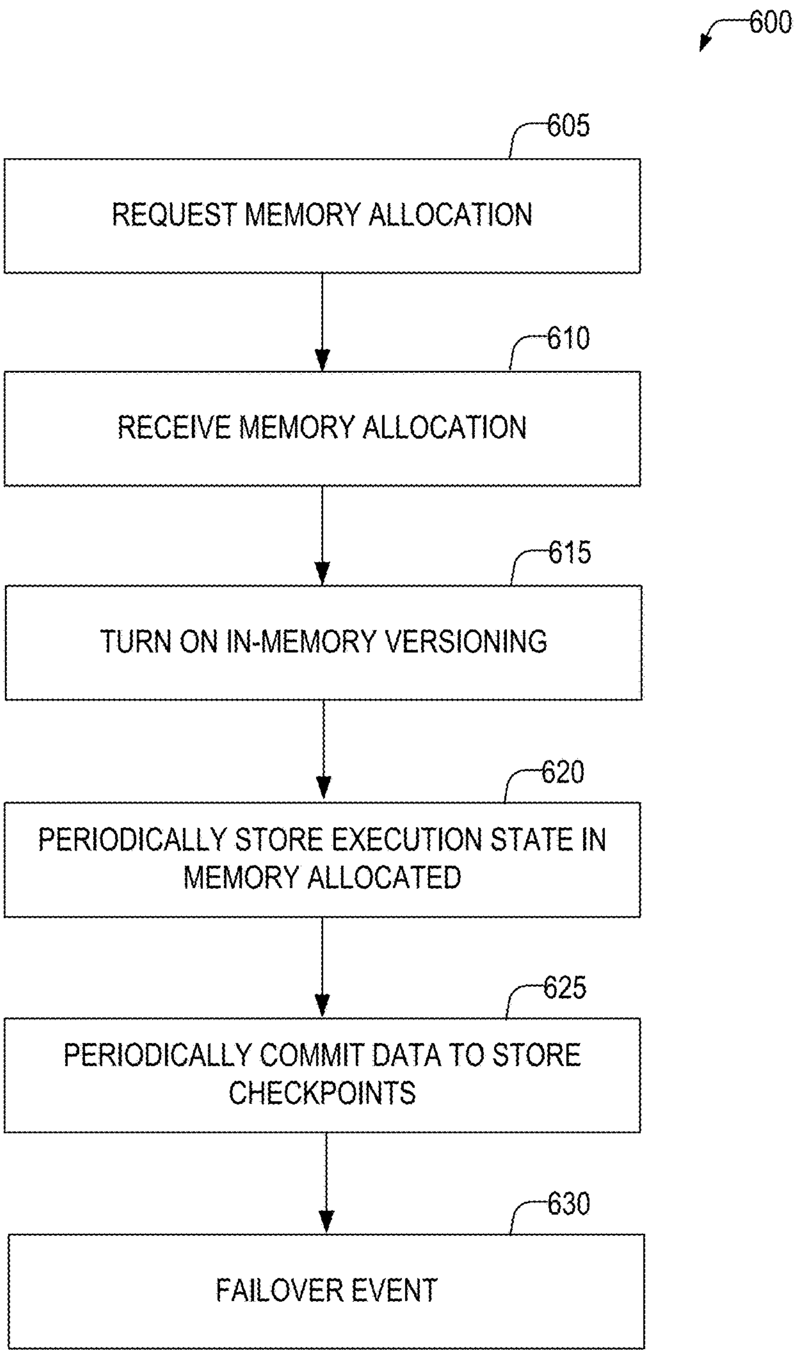
FIG. 6 illustrates a flowchart of a method of saving and checkpointing application state data according to some examples of the present disclosure.

FIG. 6 illustrates a flowchart of a method 600 of saving and checkpointing application state data according to some examples of the present disclosure. The operations of FIG. 6 may be performed by the application, an operating system, either, or both. At operation 605 the application or operating system requests a memory pool allocation. The request may include a request to assign one or more portions of the requested pool in disaggregated memory that can be configured for in-memory versioning. At operation 610, the application or operating system receives the memory allocation. The application and/or operating system may load portions of the application in the allocated memory. The allocated memory may be used as stack, heap, or other memory of the application.

At operation 615, the application and/or operating system may turn on in-memory versioning. The in-memory versioning may be enabled for one or more memory locations of the application. The in-memory versioning may be turned on by requesting it from the memory device.

At operation 620, the application may periodically store execution state information in the memory allocated at operation 610. Examples of execution state include values stored in working memory, such as stack, heap, or other memory. Other examples include operating system or architected processor state information, such as program counter and the like. In some examples, the state information is stored to a request address and the memory subsystem where the physical memory cells are located services the request from one or more actual physical memory addresses depending on the state of the in-memory versioning metadata and the type of in-memory versioning activated (e.g., either zero copy or direct copy).

At operation 625, the application may periodically commit data to store checkpoints. For example, by issuing a commit instruction to the memory system. This preserves the values currently stored in the memory. Any changes after a commit may be rolled back upon failure of the application. In some examples, the application may commit data with a specified periodicity, prior to important calculations, or the like. The decision of when to commit data may be left to the application.

At operation 630 the application may experience a failover event for which processing fails over to another instance of the application. The failover event may be a hardware or software failure.

Figure 7:
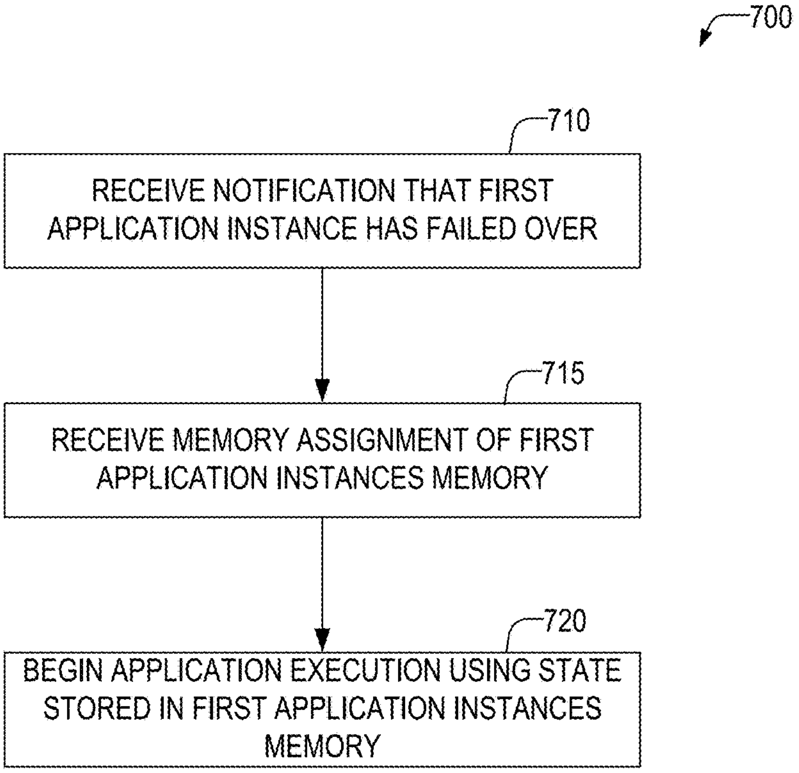
FIG. 7 illustrates a flowchart of a standby application instance beginning execution upon a failure of the primary application instance according to some examples of the present disclosure.

FIG. 7 illustrates a flowchart of a method 700 of a standby application instance beginning execution upon a failure of the primary application instance according to some examples of the present disclosure. At operation 710, the standby application instance may receive a notification that a first application instance has failed-over to this application instance. This may have been the result of an error, hardware failure, or some other reason. In some examples, this may be a command to begin execution given by an operating system. In other examples, the standby application may already be executing, but may be in a sleep state or a state in which no processing occurs. The notification at operation 710 in these examples "wakes up" the application to begin primary execution.

At operation 715 the standby application receives the memory allocation of the primary application. In some examples, the standby application "rolls back" any uncommitted changes made by the primary application. This is to prevent any untrustworthy data that may have been compromised by a glitch, by an error in the hardware or software of the primary application, or by a partial calculation that was interrupted by an error in the hardware or software from affecting future calculations.

At operation 720 the standby application begins execution using the state data saved by the primary application. In some examples, this may include executing the application at a particular point in the code using a saved program counter.

Figure 8:
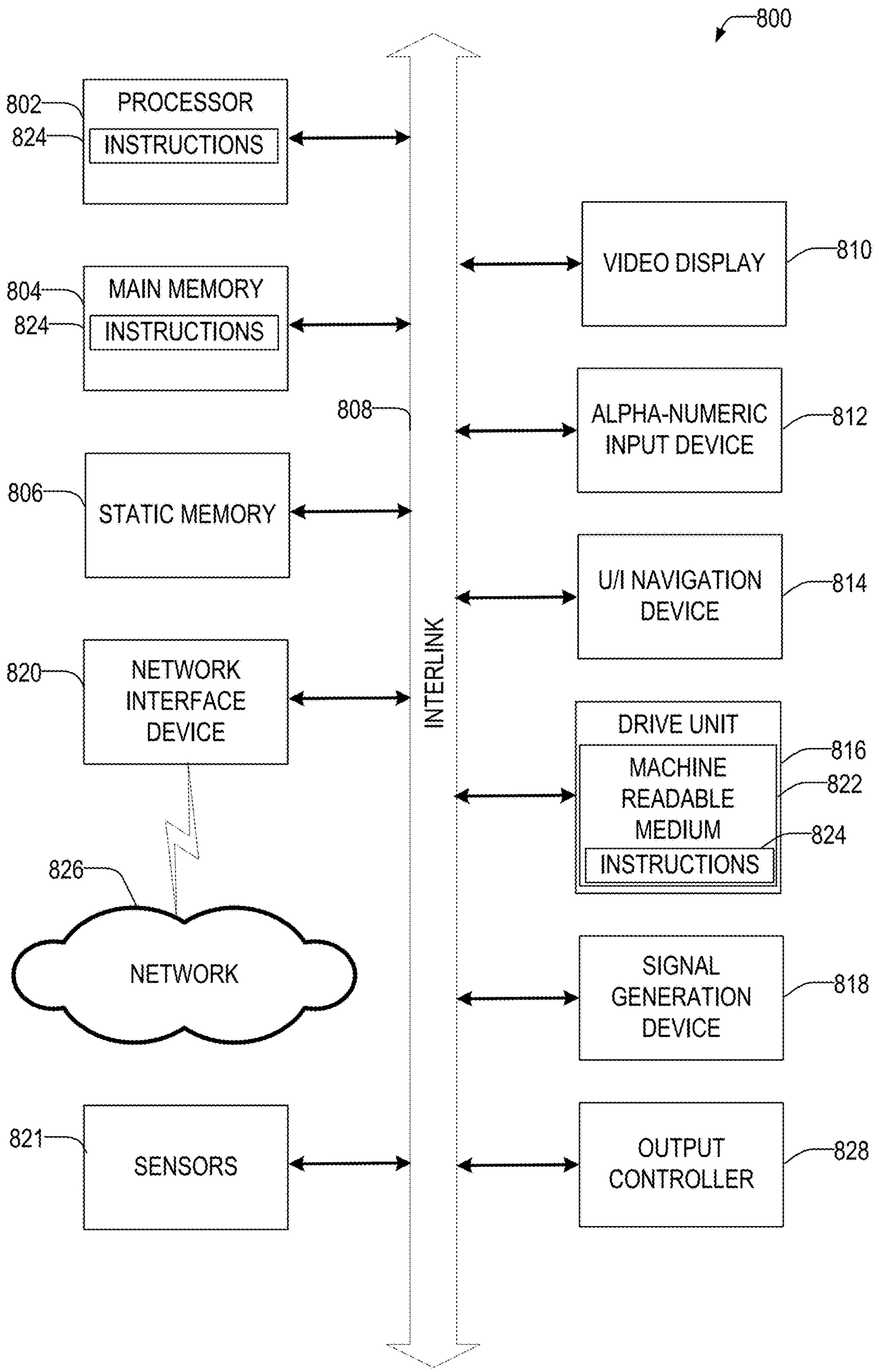
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may be performed. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be in the form of a host device, memory device, memory system, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Machine 800 may be or include components from FIGS. 1-4. Machine 800 may be configured to perform the methods of FIGS. 5, 6 and 7.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 800 may include one or more hardware processors, such as processor 802. Processor 802 may be a central processing unit (CPU), a graphics processing unit (GPU), a hardware processor core, or any combination thereof. Machine 800 may include a main memory 804 and a static memory 806, some or all of which may communicate with each other via an interlink (e.g., bus) 808. Examples of main memory 804 may include Synchronous Dynamic Random-Access Memory (SDRAM), such as Double Data Rate memory, such as DDR4 or DDR5. Interlink 808 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 824 may further be transmitted or received over a communications network 826 using a transmission medium via the network interface device 820. The Machine 800 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

Other Notes and Examples

Example 1 is a method for fast failover of an application, the method comprising: using a first hardware processing resource: assigning an allocation of memory from a disaggregated memory pool to a first application instance of an application executing on the first hardware processing resource or a second hardware processing resource, the memory allocation capable of in-memory versioning; identifying an error event during execution of the first application instance; causing a rollback of values of application state data of the first application instance stored in memory of the memory allocation to rolled-back checkpoint values, the application state data and checkpoint values both stored in different memory locations of the allocation of memory; and assigning a second application instance to the allocation of memory, including the rolled-back checkpoint values, wherein the application continues execution of the application via execution of a second instance of the application from the rolled-back checkpoint values of the application state data of the first application instance.

In Example 2, the subject matter of Example 1 includes, wherein during execution of the first application instance: storing first values of the application state data of the first application instance at a first request address of the memory allocation, the first values stored in a first one of two memory locations addressable by the first request address; saving the first values as checkpoint values using a commit operation of an in-memory versioning of the memory device; and storing second values of the application state data of the first application instance at the first request address of the memory, the second values saved at a second one of the two memory locations addressable by the first request address.

In Example 3, the subject matter of Examples 1-2 includes, wherein the memory device is shared by a first and second computing device, and wherein the first application instance is executed on the first computing device and the second application instance is executed on the second computing device.

In Example 4, the subject matter of Examples 1-3 includes, wherein the first and second application instances are executed on a same computing device.

In Example 5, the subject matter of Examples 1~4 includes, wherein the application state data comprises one or more of: a program counter, register values of the first hardware processing resource, a stack memory of the first application instance, or a pool memory of the first application instance.

In Example 6, the subject matter of Examples 1-5 includes, wherein the error event comprises a hardware error, and wherein the first hardware processing resource is restarted in response to the error event.

In Example 7, the subject matter of Examples 1-6 includes, wherein the application executing on the first or second hardware processing resource is a virtual machine.

In Example 8, the subject matter of Examples 1-7 includes, wherein the method is performed by a processor controlling a memory fabric.

In Example 9, the subject matter of Examples 1-8 includes, wherein the method is performed by the first hardware processing resources.

In Example 10, the subject matter of Examples 1-9 includes, wherein the first hardware processing resource or the second hardware processing resource is on a different computing device than a memory device where memory cells making up the allocation of memory are located.

Example 11 is a computing device comprising: a first hardware processing resource; a memory, the memory storing instructions, which when executed by the hardware processing resource causes the computing device to perform operations comprising: assigning an allocation of memory from a disaggregated memory pool to a first application instance of an application executing on the first hardware processing resource or a second hardware processing resource, the memory allocation capable of in-memory versioning; identifying an error event during execution of the first application instance; causing a rollback of values of application state data of the first application instance stored in memory of the memory allocation to rolled-back checkpoint values, the application state data and checkpoint values both stored in different memory locations of the allocation of memory; and assigning a second application instance to the allocation of memory, including the rolled-back checkpoint values, wherein the application continues execution of the application via execution of a second instance of the application from the rolled-back checkpoint values of the application state data of the first application instance.

In Example 12, the subject matter of Example 11 includes, wherein the operations further comprise: during execution of the first application instance: storing first values of the application state data of the first application instance at a first request address of the memory allocation, the first values stored in a first one of two memory locations addressable by the first request address; saving the first values as checkpoint values using a commit operation of an in-memory versioning of the memory device; and storing second values of the application state data of the first application instance at the first request address of the memory, the second values saved at a second one of the two memory locations addressable by the first request address.

In Example 13, the subject matter of Examples 11-12 includes, wherein the memory device is shared by a first and second computing device, and wherein the first application instance is executed on the first computing device and the second application instance is executed on the second computing device.

In Example 14, the subject matter of Examples 11-13 includes, wherein the first and second application instances are executed on a same computing device.

In Example 15, the subject matter of Examples 11-14 includes, wherein the application state data comprises one or more of: a program counter, register values of the first hardware processing resource, a stack memory of the first application instance, or a pool memory of the first application instance.

In Example 16, the subject matter of Examples 11-15 includes, wherein the error event comprises a hardware error, and wherein the first hardware processing resource is restarted in response to the error event.

In Example 17, the subject matter of Examples 11-16 includes, wherein the application executing on the first or second hardware processing resource is a virtual machine.

In Example 18, the subject matter of Examples 11-17 includes, wherein the computing device controls a memory fabric.

In Example 19, the subject matter of Examples 11-18 includes, wherein the first hardware processing resource or the second hardware processing resource on a different computing device than a memory device where memory cells making up the allocation of memory are located.

Example 20 is a non-transitory machine-readable medium, storing instructions, which when executed by a machine, causes the machine to perform operations comprising: assigning an allocation of memory from a disaggregated memory pool to a first application instance of an application executing on the first hardware processing resource or a second hardware processing resource, the memory allocation capable of in-memory versioning; identifying an error event during execution of the first application instance; causing a rollback of values of application state data of the first application instance stored in memory of the memory allocation to rolled-back checkpoint values, the application state data and checkpoint values both stored in different memory locations of the allocation of memory; and assigning a second application instance to the allocation of memory, including the rolled-back checkpoint values, wherein the application continues execution of the application via execution of a second instance of the application from the rolled-back checkpoint values of the application state data of the first application instance.

In Example 21, the subject matter of Example 20 includes, wherein the operations further comprise: during execution of the first application instance: storing first values of the application state data of the first application instance at a first request address of the memory allocation, the first values stored in a first one of two memory locations addressable by the first request address; saving the first values as checkpoint values using a commit operation of an in-memory versioning of the memory device; and storing second values of the application state data of the first application instance at the first request address of the memory, the second values saved at a second one of the two memory locations addressable by the first request address.

In Example 22, the subject matter of Examples 20-21 includes, wherein the memory device is shared by a first and second computing device, and wherein the first application instance is executed on the first computing device and the second application instance is executed on the second computing device.

In Example 23, the subject matter of Examples 20-22 includes, wherein the first and second application instances are executed on a same computing device.

In Example 24, the subject matter of Examples 20-23 includes, wherein the application state data comprises one or more of: a program counter, register values of the first hardware processing resource, a stack memory of the first application instance, or a pool memory of the first application instance.

In Example 25, the subject matter of Examples 20-24 includes, wherein the error event comprises a hardware error, and wherein the first hardware processing resource is restarted in response to the error event.

In Example 26, the subject matter of Examples 20-25 includes, wherein the application executing on the first or second hardware processing resource is a virtual machine.

In Example 27, the subject matter of Examples 20-26 includes, wherein the machine controls a memory fabric.

In Example 28, the subject matter of Examples 20-27 includes, wherein the first hardware processing resource or the second hardware processing resource on a different computing device than a memory device where memory cells making up the allocation of memory are located.

Example 29 is at least one machine-readable medium including instructions that, when executed by processing circuitry, cause the processing circuitry to perform operations to implement of any of Examples 1-28.

Example 30 is an apparatus comprising means to implement any of Examples 1-28.

Example 31 is a system to implement any of Examples 1-28.

Example 32 is a method to implement any of Examples 1-28.

What is claimed is:

1. A method for fast failover of an application, the method comprising:

assigning an allocation of memory from a disaggregated memory pool to a first application instance of an application executing on a first hardware processing resource or a second hardware processing resource;

causing implementation of in-memory versioning for the memory allocation, wherein the in-memory versioning maintains checkpoint values and working values in different physical memory locations addressable by a same request address;

causing periodic storing of application state data at a first memory location of the memory allocation and committing the application state data as checkpoint values at a second memory location of the memory allocation using in-memory versioning commit operations;

identifying an error event during execution of the first application instance;

causing a rollback of values of the application state data of the first application instance stored in memory of the memory allocation to committed checkpoint values stored in the second memory location, without requiring access to non-volatile storage; and assigning a second application instance to the allocation of memory, including the committed checkpoint values, wherein the application continues execution of the application via execution of a second instance of the application from the committed checkpoint values of the application state data of the first application instance.

2. The method of claim 1, wherein the application state data comprises one or more of: a program counter, register values of the first hardware processing resource, a stack memory of the first application instance, or a pool memory of the first application instance.

3. The method of claim 1, wherein the disaggregated memory pool is on a memory device that is shared by a first and second computing device, and wherein the first application instance is executed on the first computing device and the second application instance is executed on the second computing device.

4. The method of claim 1, wherein the first hardware processing resource or the second hardware processing resource is on a different computing device than a memory device where memory cells making up the allocation of memory are located.

5. The method of claim 1, wherein the in-memory versioning utilizes a Zero Copy (ZC) mode that alternates between two memory locations serving as a checkpoint memory location and a working copy memory location between each checkpoint, with metadata fields including a select field indicating which memory location is the working copy memory location and a dirty field indicating whether the memory location was updated since a last checkpoint.

6. The method of claim 1, wherein the in-memory versioning utilizes a Direct Copy (DC) mode where an active working copy is found in a particular one of the different physical memory locations, and wherein on write requests, a dirty field is checked and if not set, copying a working location to a checkpoint location.

7. The method of claim 1, further comprising: receiving a memory allocation request from the first application instance requesting memory allocation from the disaggregated memory pool with in-memory versioning capability; and returning the allocation to a requestor with addresses for accessing the memory and status information.

8. A computing device for fast failover of an application, the computing device comprising:

a hardware processor;

a memory, the memory storing instructions, which when executed by the hardware processor cause the computing device to perform operations comprising:

assigning an allocation of memory from a disaggregated memory pool to a first application instance of an application executing on a first hardware processing resource or a second hardware processing resource;

causing implementation of in-memory versioning for the memory allocation, wherein the in-memory versioning maintains checkpoint values and working values in different physical memory locations addressable by a same request address;

causing periodic storing of application state data at a first memory location of the memory allocation and committing the application state data as checkpoint values at a second memory location of the memory allocation using in-memory versioning commit operations;

identifying an error event during execution of the first application instance;

causing a rollback of values of the application state data of the first application instance stored in memory of the memory allocation to committed checkpoint values stored in the second memory location, without requiring access to non-volatile storage; and assigning a second application instance to the allocation of memory, including the committed checkpoint values, wherein the application continues execution of the application via execution of a second instance of the application from the committed checkpoint values of the application state data of the first application instance.

9. The computing device of claim 8, wherein the operation of assigning an allocation of memory further comprises: assigning memory such that the application state data comprises one or more of: a program counter, register values of the hardware processor, a stack memory of the first application instance, or a pool memory of the first application instance.

10. The computing device of claim 8, wherein the disaggregated memory pool is on a memory device that is shared by a first and second computing device, and wherein the first application instance is executed on the computing device and the second application instance is executed on the second computing device.

11. The computing device of claim 8, wherein the computing device is on a different computing device than a memory device where memory cells making up the allocation of memory are located.

12. The computing device of claim 8, wherein the in-memory versioning utilizes a Zero Copy (ZC) mode that alternates between two memory locations serving as a checkpoint memory location and a working copy memory location between each checkpoint, with metadata fields including a select field indicating which memory location is the working copy memory location and a dirty field indicating whether the memory location was updated since a last checkpoint.

13. The computing device of claim 8, wherein the in-memory versioning utilizes a Direct Copy (DC) mode where an active working copy is found in a particular one of different physical memory locations, and wherein the operation of periodically storing application state data further comprises: on write requests, checking a dirty field and, if not set, copying a working location to a checkpoint location.

14. The computing device of claim 8, wherein the operations further comprise: receiving a memory allocation request from the first application instance requesting a memory allocation from the disaggregated memory pool with in-memory versioning capability; and returning the allocation to a requestor with addresses for accessing the memory and status information.

15. A non-transitory computer-readable medium, storing instructions for fast failover of an application, the instructions, which when executed, cause a computing device to perform operations comprising:

assigning an allocation of memory from a disaggregated memory pool to a first application instance of an application executing on a first hardware processing resource or a second hardware processing resource;

causing implementation of in-memory versioning for the memory allocation, wherein the in-memory versioning maintains checkpoint values and working values in different physical memory locations addressable by a same request address;

causing periodic storing of application state data at a first memory location of the memory allocation and committing the application state data as checkpoint values at a second memory location of the memory allocation using in-memory versioning commit operations;

identifying an error event during execution of the first application instance;

causing a rollback of values of the application state data of the first application instance stored in memory of the memory allocation to committed checkpoint values stored in the second memory location, without requiring access to non-volatile storage; and assigning a second application instance to the allocation of memory, including the committed checkpoint values, wherein the application continues execution of the application via execution of a second instance of the application from the committed checkpoint values of the application state data of the first application instance.

16. The non-transitory computer-readable medium of claim 15, wherein the operation of assigning an allocation of memory further comprises: assigning memory such that the application state data comprises one or more of: a program counter, register values of the first hardware processing resource, a stack memory of the first application instance, or a pool memory of the first application instance.

17. The non-transitory computer-readable medium of claim 15, wherein the disaggregated memory pool is on a memory device that is shared by a first and second computing device, and wherein the first application instance is executed on the first computing device and the second application instance is executed on the second computing device.

18. The non-transitory computer-readable medium of claim 15, wherein the first hardware processing resource or the second hardware processing resource is on a different computing device than a memory device where memory cells making up the allocation of memory are located.

19. The non-transitory computer-readable medium of claim 15, wherein the in-memory versioning utilizes a Zero Copy (ZC) mode that alternates between two memory locations serving as a checkpoint memory location and a working copy memory location between each checkpoint, with metadata fields including a select field indicating which memory location is the working copy memory location and a dirty field indicating whether the memory location was updated since a last checkpoint.

20. The non-transitory computer-readable medium of claim 15, wherein the in-memory versioning utilizes a Direct Copy (DC) mode where an active working copy is found in a particular one of the different physical memory locations, and wherein the operation of periodically storing application state data further comprises: on write requests, checking a dirty field and, if not set, copying a working location to a checkpoint location.

* * * * *